Feb. 28, 1967  HIDEKI MAKABE ETAL  3,306,158
GRATING SPECTROSCOPES

Filed May 28, 1963

3,306,158
GRATING SPECTROSCOPES

Hideki Makabe, Mukomachi, Otokuni-gun, Kyoto, and Shojiro Hashizume, Jyoto-ku, Osaka, Japan, assignors to Shimadzu Seisakusho Ltd., Nakagyo-ku, Kyoto, Japan
Filed May 28, 1963, Ser. No. 283,941
Claims priority, application Japan, May 29, 1962, 37/22,068
4 Claims. (Cl. 88—14)

This invention relates to grating spectroscopes, and more particularl, to refletcion grating spectroscopes.

The use of diffraction gratings instead of refraction prisms for the study of spectra brings advantages of constant and usually greater dispersion and resolution, as well as opportunity to observe extreme ultra-violet and infra-red spectra for which no transparent prisms can be found. Modern gratings are made by ruling with a diamond point equidistant parallel lines on a polished plate of brass, of speculum (copper+tin) metal, or of glass on which a film of aluminum has been deposited. Those in most general use for visible and ultra-violet spectra have either 15,000, 20,000, 24,000 or 30,000 lines per inch and effective ruled areas ranging from about 2 to 6 inches. A grating with 15,000 lines per inch permits measurements in infra-red spectra to 30,000 A., but for the investigation of longer waves coarser gratings must be used. In 1910 R. W. Wood first ruled 2,000 to 3,600 lines per inch on copper plates and by proper choice of groove form succeeded in concentrating much of the visible light into relatively high orders. Such "echelette" gratings concentrate the greater part of infrared energy in a first-order spectrum and they can be ruled to perform in this manner for almost any desired wave length. Thus, a grating with 900 lines per inch may be made to function well at about 300,000 A., 360 lines per inch around 900,000 A. and 80 lines per inch around 1,500,000 A. These coarse echelette gratings have ruled surfaces up to 10 x 20 inches in area and are usually cut in a solder surface with a steel tool. A grating ruled on a sheet of transparent glass is called "transmission grating," but it is impossible to rule large areas of glass without wearing down the diamond point. For this and other good reasons most gratings are ruled on opaque soft metal surfaces, and are called "reflection gratings." The fundamental principle is the same in both cases.

The simple theory of the reflection grating gives the wave-length of light as a function of the grating space and of angles of incidence and diffraction of the light rays. Suppose that a beam of parallel rays falls on a echelette reflection grating with a grating space $b$. The difference in path travelled by corresponding rays from adjacent grooves, or the retardation as it is called, is given by the general equation:

$$n\lambda = b(\sin i \pm \sin \theta n)$$

wherein $n$ is the order number. $\lambda$ is the wave length, $i$ is the angle of incidence with the normal and $\theta n$ is the angle of diffraction in the $n$-order with the normal, the positive or negative sign being used when incident and diffracted rays are on the same or opposite sides of the normal, respectively. When this equals one or more whole wave lengths $n\lambda$, a bright image is seen in color corresponding to $\lambda$. If the incident and diffracted rays are on the same sides of the normal and the angle of incidence is nearly equal to the angle of diffraction, $$\lambda \cong \frac{2b}{n} \sin i$$

If the grating space is not too small the groove form of the ruled lines can be controlled by shaping the diamond point in such a way that the diffracted light is largely concentrated in one general direction or spectral region. Such gratings may, for example, give an intense visible spectrum and weak ultra-violet, or vice versa. The wave length of the most intense energy is called the "blaze" wavelength. The blaze wavelength is obtained when the angle of incidence becomes normal to the inclination of the ruled line grooves. The condition for the blaze wave length depends on the grating space and the inclination of the ruled line grooves. For example, in a diffraction grating with 75 lines per 1 mm., namely with a grating space $\frac{1}{75}$ mm., the energy of the diffraction rays is maximum when the inclination of the ruled line grooves with the normal is 26°45′, the glaze wavelengths being $12\mu$ in the first-order spectrum, $6\mu$ in the second-order and etc. Various diffraction orders in a single grating gave different ranges of wavelength. The wavelength observed may be changed by revolving the grating about an axis. The movement of the grating for scanning is usually given by a peripheral cam which may be called a "wavelength cam" or "wavenumber cam." The scanning in any one order spectra is carried out with use of a filter or monochromator of a low dispersion degree before the inlet slit or after the outlet slit so that any other order spectra may be eliminated. At the end of the scanning operation in the first-order spectra the grating must be turned back to the former position for the scanning in the next order spectra. For this purpose, the wavelength cam should be shaped in a cliff form at this position. A series of scanning over two or more order spectral regions is inevitably discontinuous. In case that the spectrum diagram is fed in interconnection with the wavelength or wavenumber cam, the spectrum diagram will become discontinuous at the cliff portions of the cam. The wavelength or wavenumber cam with any cliff portions is disadvantageous in that it is irreversible in the movement. In addition the higher the order, the more frequent changes in the order is necessary.

In view of the above mentioned drawbacks common to conventional grating spectroscopes with a single grating, it is a principal object of the invention to provide a grating spectroscope in which the scanning operation can be continuously carried out through a wide wavelength region or over two or more order spectral regions.

Another object of the invention is to provide a grating spectroscope in which the scanning operation may be carried out reversibly at any wavenumber region.

A still further object is to provide a grating spectroscope in which the measurements can be made over a wide wavelength region with a relatively small number of the interchange of gratings and/or spectral orders.

According to the invention, at least two diffraction gratings are arranged on a turntable rotatable about an axis in such a spaced relationship that they may be positioned alternatively in the optical path of the spectroscope. The diffraction gratings may be of a echelette reflection type and have different grating spaces for different wavelength regions. The two different gratings may have different first-order spectral regions. The first-order spectral region is the strongest in the spectral intensity and the widest. The number of interchange of spectral regions may be reduced in comparison with the case with a single grating.

In a preferred embodiment of the invention, the gratings are actuated by their own cams to be rotated about their own axes. These cams are incorporated with each other and arranged on a single axis which may be in the line of the axis of the turntable. The cams are freely rotatable on the axis of the turntable. Each of cams has at least one operative angle range which is operative when the corresponding gratings is in the optical path of the spectroscope. The remained angle portion may be shaped in any form but so as not to form any cliff. In this manner, each cam is reversible at any wavelength or wavenumber region.

One or some of the gratings may be used over two spectral order ranges which have different wavelength regions spaced to each other. The wavelength region therebetween may be covered by another grating. In this case the cam for the grating covering two different wavelength regions has accordingly two operative angle ranges. The remained portions between the two operative angle ranges may be shaped with gradual slopes so as not to form any cliff. In this manner, this cam is also shaped in a continuous peripheral form so as not to form any cliff.

Other objects and advantages of the invention will become apparent from the detailed description which follows when taken in conjunction with the accompanying drawings in which.

Figure 1:
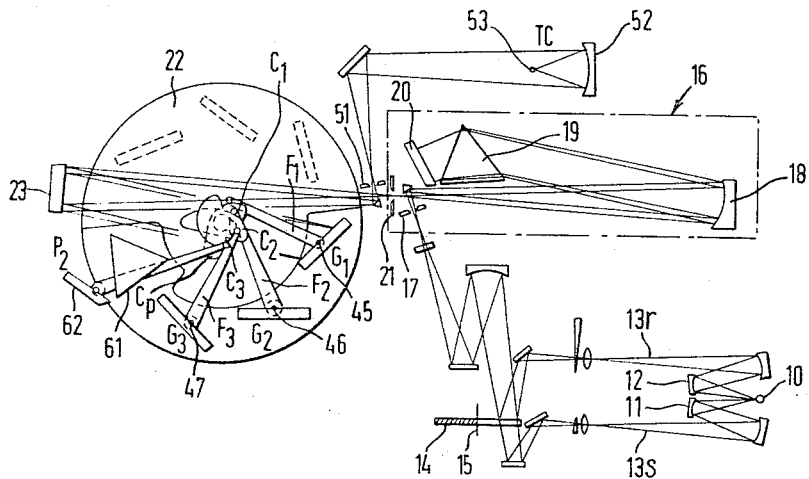
FIG. 1 is a schematic view showing the optical system of the apparatus of the invention.

Referring now more particularly to the drawings, the basic system of the grating spectroscope of the invention is illustrated in FIG. 1. The light from a light source 10 is divided by a pair of mirrors 11 and 12 into two beams 13s and 13r. These two beams illustrate the system alternatively. The sample to be analyzed is put in one beam 13s while the other beam 13r with no sample is merely used for the reference. The two beams 13s and 13r may be called a "sample beam" and a "reference beam," respectively. The spectroscopic system of the invention is illustrated at a time by either of the two beams 13s and 13r. 14 denotes a mirror for illustrating the system with one of the two beams, selectively. The mirror 14 may be shaped in a semi-circular form and rotate about an axis 15 at a high speed so that the system may be illustrated with the sample beam during the first half rotation of the mirror 14 and with the reference beam during the second half rotation. Though, preferably, the system of the invention is illustrated in such a double beam manner as described above, the system may be illustrated with a single beam.

The sample beam or reference beam enters into a monochromator generally indicated as 16. The monochromator 16 may be of a low dispersion degree to roughly disperse the white light from the light source 10 and comprise an inlet slit 17, a collimating mirror 18, a prism 19, a Littrow mirror 20 and an outlet slit 21. The monochromator 16 may be replaced by a suitable filter 1 which will allow only a narrow range of wavelength or wavenumber to pass therethrough.

A selected narrow range of wavelength or wavenumber leaving from the outlet slit 21 of the monochromator 16 enters into the spectral apparatus of the invention which includes at least two gratings which are mounted on a turntable. In the embodiment illustrated by way of example in FIG. 1, three gratings $G_1$, $G_2$ and $G_3$ are mounted vertically on a turntable 22 which is rotatable about a central axis. The three gratings $G_1$, $G_2$ and $G_3$ are arranged on the turntable 22 in a spaced relationship so that when the turntable 22 is turned, they may successively become in the line of reflection from a collimating mirror 23. The collimating mirror 23 makes parallel the rays leaving from the slit 21 of the monochromator 16.

Figure 2:
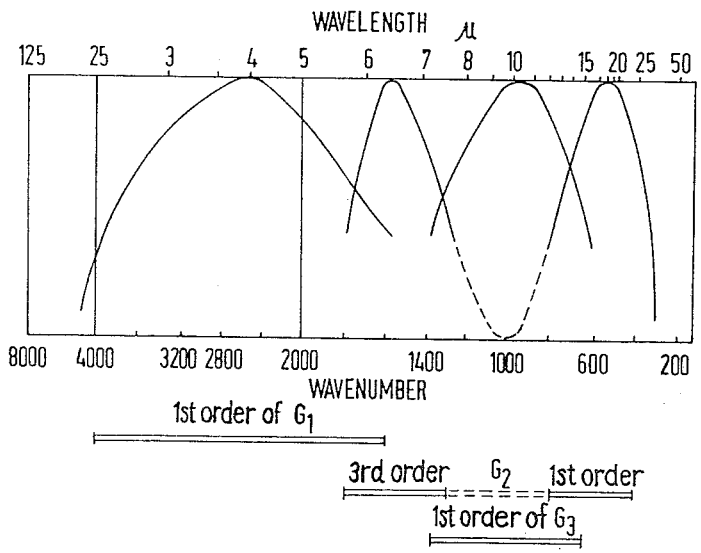
FIG. 2 is a diagram showing the energy distributions of diffracted lights from three gratings.

Each of gratings $G_1$, $G_2$ and $G_3$ may be of an echelette reflection type. Three gratings may have different grating spaces and different blaze wavelengths for different wavelength ranges. For example, in case of the spectral analysis of infrared rays, the first grating $G_1$ may have 150 ruled lines per mm. with a blaze wavelength of $4\mu$ in the first-order while the second and third gratings $G_2$ and $G_3$ may have 45 and 75 ruled lines per mm. with blaze wavelengths of $20\mu$ and $12\mu$ in the first-order, respectively. The energy distributions of the diffracted lights from these three gratings are shown in FIG. 2. It will be understood from FIG. 2 that the second grating has also a blaze wavelength of about $6.6\mu$ in the third-order.

The first grating $G_1$ can be used in the first-order for the wavenumber range from 4,000 cm.$^{-1}$ to 1,550 cm.$^{-1}$, the second grating $G_2$ in the third-order for the wavenumber range from 1,750 cm.$^{-1}$ to 1,280 cm.$^{-1}$, the third grating $G_3$ in the first-order for the wavenumber range from 1,360 cm.$^{-1}$ to 650 cm.$^{-1}$ and the second grating $G_2$ in the first-order for the wavenumber range from 780 cm.$^{-1}$ to 400 cm.$^{-1}$. The combination of these four contiguous wavenumber ranges covers a wide wavenumber region from 4,000 cm.$^{-1}$ to 400 cm.$^{-1}$ with the respective spectral intensities strong enough to be detected.

The diffracted light from any of the gratings $G_1$, $G_2$ and $G_3$ is reflected by the mirror 23 toward an outlet 51. Only a single wavelength passes through the outlet slit 51 and in turn reaches a detector 53 to focus through a mirror 52 into a spectrum on it. The detector 53 may be of any of visual, photoelectric, radiometric and photographic types.

Figure 3:
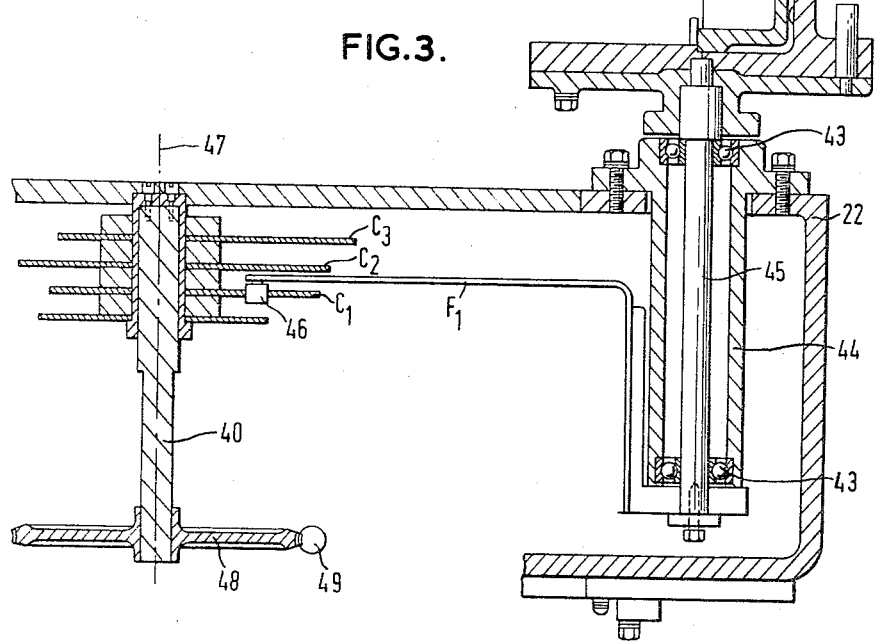
FIG. 3 is a vertical sectional view of the turntable with gratings and their own actuating cams, partly cut off.

The wavelength which passes through the outlet slit 51 varies according to the angle of incidence on the grating. The angle of incidence can be varied by moving the grating about its own axis. The movement of the grating about its own axis may be controlled by a cam. This cam is usually called the "wavelength cam" or "wavenumber cam." FIG. 3 illustrates by way of example means for moving the first gratings $G_1$ about its own axis by a peripheral cam. The grating $G_1$ is pivotally carried through bearings 43 by a bracket 44 fixed on the turntable 22. The pivot 45 of the grating $G_1$ is secured to one end of a cam follower $F_1$. The cam follower $F_1$ is provided at the other end with a roller 46 which engages with a cam $C_1$ which is in turn fixed on a shaft 40. The shaft 40 is alined with the central axis 47 of the turntable 22. 48 is a worm-wheel which is fixed on the shaft 40 and driven by a worm 49 which is in turn connected through gearing to a power drive such as a motor (not shown). When the cam $C_1$ is turned, the grating $G_1$ with the cam follower $F_1$ is moved about the pivotal axis 45, whereby the angle of incidence to the grating $G_1$ may be varied. In the same manner, the other two gratings $G_2$ and $G_3$ (not shown in FIG. 3) are pivotally carried on the turntable 22 and engage at their own followers with the respective cams $C_2$ and $C_3$. Three wavenumber cams $C_1$, $C_2$ and $C_3$ are fixed on the single shaft 40 so that they may be rotated as one body. In FIG. 1, $F_2$ and $F_3$ are the cam followers corresponding to the two wavenumber cams $C_2$ and $C_3$ for the second and the third gratings $G_2$ and $G_3$, respectively.

Figure 4:
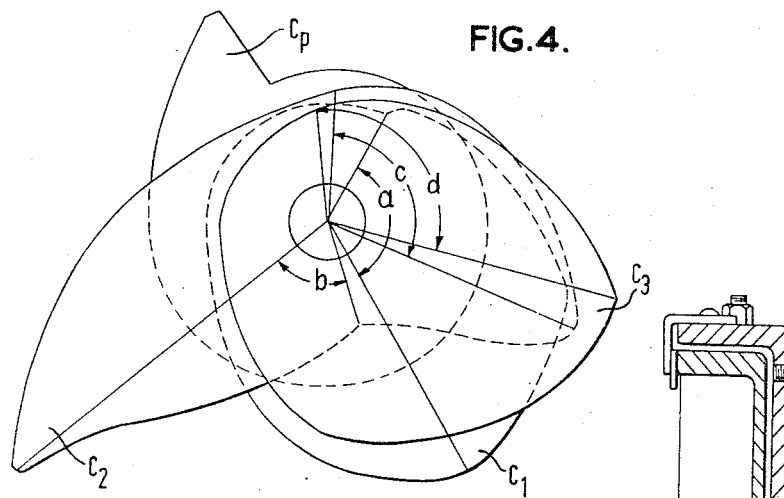
FIG. 4 is a plan view of the cams for actuating the respective gratings, showing the respective operative angle ranges.

The cams $C_1$, $C_2$ and $C_3$ have their own operative angle ranges which are operative when the respective gratings $G_1$, $G_2$ and $G_3$ are in the line of reflection from the collimating mirror 23. FIG. 4 shows the operative angle ranges of the cams. The cam $C_1$ has an operative angle range indicated as $a$, the cam $C_2$ has two operative angle ranges $b$ and $c$, and the cam $C_3$ has an operative angle range $d$. The rollers at the ends of the respective followers $F_1$, $F_2$ and $F_3$ travel these operative angle range when the respective gratings are in the optical path. The remained or transition angle ranges in the respective cams may be shaped by gradual slopes so as not to form any cliff. In this manner each cam may be shaped in a continuous form with no cliff and, accordingly, reversible in the opposite directions.

The scanning operation is as follows:

The first grating $G_1$ is first set in the optical path as shown in FIG. 1. The grating $G_1$ is illustrated with a selected narrow range of wavenumber passing through the slit 21 of the monochromator 16. The wavenumber range corresponds to the spectral region to be scanned with grating $G_1$. At this state, the movement of the grating $G_1$ about its axis 45 by the first wavenumber cam $C_1$ may scan the wavenumber region from 4,000 to 1,550 cm.$^{-1}$ in the first-order spectra, the roller at the end of the cam follower $F_1$ travelling over the operative angle range $a$ of the cam $C_1$. At the end of the scanning with the first grating $G_1$, the turntable 21 is turned until the second grating $G_2$ becomes in the optical path to take the place of the first grating $G_1$. During the movement of the turntable the cam shaft 40 is kept stationary. When the second grating $G_2$ has been set in the optical path, the roller at the end of the cam follower $F_2$ is situated at one end of the operative angle range $b$ of the second wavenumber cam $C_2$. The wavenumber range with which the second grating $G_2$ is illuminated is shifted to a contiguous one by the monochromator 16. During the next rotation of the cam shaft 40, the second grating $G_2$ may scan the wavenumber region from 1,750 to 1,280 cm.$^{-1}$ in the third-order spectra. The cam follower $F_2$ travels over the operative angle range $b$ of the second wavenumber cam $C_2$. The two contiguous spectral regions which are scanned with the first and second cams $G_1$ and $G_2$ have a common range from 1,750 to 1,550 cm.$^{-1}$ in the wavenumber. The interchange of the two gratings may be carried out at any wavenumber in the overlapped region. The interchange of the gratings from $G_2$ to $G_3$ is carried out in the same manner. The third grating $G_3$ may scan the wavenumber region from 1,360 to 650 cm.$^{-1}$ in the first-order spectra. At the end of the scanning with the third grating $G_3$, the turntable is turned back until the second grating $G_2$ becomes in the optical path again. Then, while the second cam follower $F_2$ travels over the other operative angle range $c$ of the second wavenumber cam $C_2$, the second grating $G_2$ may scan the wavenumber region from 780 to 400 cm.$^{-1}$ in the first-order spectra.

A spectroscope of Littrow's type may be combined with the above apparatus according to the invention. For example, a prism spectroscopic means including a prism 61 and a Littrow's mirror 62 are deposited on the table 22. The spectroscopic means is so arranged on the table 22 that it may become in the optical path to replace any of the gratings. The Littrow's mirror 62 may be driven by a cam $C_p$ which is fixed on the same shaft 40 for the above mentioned three cams $C_1$, $C_2$ and $C_3$. The prism spectroscopic means have charge of a different wavenumber region from those of the above three gratings.

Although some particular embodiments of the invention have been illustrated, it is understood that the invention is not limited thereto since various modifications may be made, and it is contemplated by the appended claims to cover any such modification as fall within the true spirit and scope of the invention.

What we claim is:

1. A grating spectroscope comprising a turntable rotatable about a central axis, at least two diffraction gratings arranged on said table at its peripheral portion in a spaced relationship so that when said turntable is rotated said diffraction gratings pass through the optical path of the spectroscope, said diffraction gratings being rotatable about their own axes, a cam shaft rotatably carried on said central axis of said turntable, actuating cams for revolving the respective diffrction gratings, said cams being mounted on said cam shaft, and substantially radially extending cam followers each engaging at one end with a respective one of said cams and coupled at their other end to rotatably position a respective one of said diffraction gratings.

2. A grating spectroscope as defined in claim 1 in which said diffraction gratings have different grating spaces for the different spectral regions to, in combination, cover a wide spectral region, and wherein said cams each have separate operative angle ranges which are operative for scanning predetermined spectral regions when the respective gratings are in the optical path of the spectroscope.

3. A grating spectroscope as defined in claim 2, in which each of said cams is formed to provide a continuous and endless periphery consisting of at least one operative angle range and one non-operative angle range.

4. A grating spectroscope as defined in claim 3 in which selected ones of said cams have at least two spaced, operative angle ranges for scanning different spectral regions in different orders of the corresponding grating, the non-operative angle ranges of said selected cams being shaped to provide continuous cam surfaces.

References Cited by the Examiner

UNITED STATES PATENTS

| 2,948,185 | 8/1960 | Ward et al. | 88—14 |
| 3,062,089 | 11/1962 | Martin | 88—14 |
| 3,144,498 | 8/1964 | Alpert et al. | 88—14 |

OTHER REFERENCES

Tarbet et al., "Infrared Vacuum Spectrometer With Prism/Grating Double Monochromator," Journal of the Optical Society of America, Vol. 49, No. 6, June 1959, pp. 603–608.

JEWELL H. PEDERSEN, *Primary Examiner.*

RONALD L. WIBERT, *Examiner.*